United States Patent
Hu et al.

(10) Patent No.: US 10,294,139 B2
(45) Date of Patent: May 21, 2019

(54) METHOD AND APPARATUS FOR MAKING A GLASS LAMINATE

(71) Applicant: Corning Incorporated, Corning, NY (US)

(72) Inventors: Guangli Hu, Berkeley Heights, NJ (US); Bin Zhang, Penfield, NY (US); Chunfeng Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/115,998

(22) Filed: Aug. 29, 2018

(65) Prior Publication Data

US 2018/0370837 A1    Dec. 27, 2018

Related U.S. Application Data

(62) Division of application No. 15/162,858, filed on May 24, 2016, now abandoned.

(Continued)

(51) Int. Cl.
| | |
|---|---|
| *C03B 17/06* | (2006.01) |
| *C03B 17/02* | (2006.01) |
| *C03B 27/00* | (2006.01) |
| *C03B 27/012* | (2006.01) |
| *B32B 17/06* | (2006.01) |
| *C03C 3/093* | (2006.01) |

(Continued)

(52) U.S. Cl.
CPC ............ *C03B 17/068* (2013.01); *B32B 17/06* (2013.01); *C03B 17/02* (2013.01); *C03B 17/064* (2013.01); *C03B 17/067* (2013.01); *C03C 1/00* (2013.01); *C03C 3/091* (2013.01); *C03C 3/093* (2013.01)

(58) Field of Classification Search
CPC ... C03B 17/068; C03B 17/065; C03B 17/064; C03B 17/067; C03B 17/02; C03B 23/02–23/037; C03B 27/00; C03B 32/00; C03B 18/12
See application file for complete search history.

(56) References Cited

U.S. PATENT DOCUMENTS

| | | | |
|---|---|---|---|
| 2,823,491 A | | 2/1958 | Long |
| 2,951,315 A | * | 9/1960 | Cousen ................... C03B 13/10 65/145 |

(Continued)

OTHER PUBLICATIONS

"Thermal properties of Corning glasses", http://www.quartz.com/pxtherm.pdf, retrieved Jan. 6, 2012.

(Continued)

*Primary Examiner* — Jason L Lazorcik
(74) *Attorney, Agent, or Firm* — Shantanu C. Pathak

(57) ABSTRACT

An apparatus for making a glass laminate, including:
a source of a glass core sheet;
a source of a first force that tensions the glass core sheet in a first axial direction;
a source of a second force that tensions the glass core sheet in a second axial direction; and
at least one molten glass reservoir extending along a length of the apparatus and on opposite sides of the glass core sheet that delivers a source of at least two glass clads to the opposite side surfaces of the bi-axially tensioned glass core sheet. Also disclosed are methods for making a glass laminate sheet using the disclosed apparatus, as defined herein.

5 Claims, 10 Drawing Sheets

Related U.S. Application Data

(60) Provisional application No. 62/168,011, filed on May 29, 2015.

(51) Int. Cl.
*C03C 3/091* (2006.01)
*C03C 1/00* (2006.01)

(56) References Cited

U.S. PATENT DOCUMENTS

| | | | | |
|---|---|---|---|---|
| 3,477,836 | A * | 11/1969 | Storm, Jr. | C03B 13/10 65/121 |
| 3,673,049 | A | 6/1972 | Giffen | |
| 4,024,309 | A * | 5/1977 | Pender | B22D 11/00 428/312.6 |
| 4,214,886 | A | 7/1980 | Shay | |
| 4,612,030 | A * | 9/1986 | Smids | C03B 13/08 65/101 |
| 5,375,012 | A | 12/1994 | Borrelli | |
| 5,559,060 | A | 9/1996 | Dumbaugh, Jr. | |
| 7,201,965 | B2 | 4/2007 | Gulati et al. | |
| 7,748,236 | B2 | 7/2010 | Pitbladdo | |
| 7,851,394 | B2 | 12/2010 | Ellison | |
| 8,007,913 | B2 | 8/2011 | Coppola | |
| 8,047,085 | B2 * | 11/2011 | Cady | G01L 5/16 73/862.49 |
| 8,429,936 | B2 | 4/2013 | Allan | |
| 8,528,364 | B2 * | 9/2013 | Anderson | C03B 17/068 65/201 |
| 8,627,684 | B2 | 1/2014 | Shultz et al. | |
| 8,966,940 | B2 * | 3/2015 | Kumada | C03B 23/047 65/92 |
| 9,090,505 | B2 | 7/2015 | Godard | |
| 9,315,409 | B2 * | 4/2016 | Anderson | C03B 17/068 |
| 9,388,065 | B2 * | 7/2016 | Agrawal | C03B 17/068 |
| 9,458,044 | B2 * | 10/2016 | Bisson | C03B 17/02 |
| 2004/0093900 | A1 * | 5/2004 | Fredholm | C03B 17/064 65/25.3 |
| 2004/0197575 | A1 * | 10/2004 | Bocko | B32B 17/06 428/432 |
| 2009/0107182 | A1 * | 4/2009 | Anderson | C03B 17/068 65/90 |
| 2011/0200804 | A1 * | 8/2011 | Tomamoto | B32B 17/06 428/213 |
| 2011/0200805 | A1 * | 8/2011 | Tomamoto | C03B 23/037 428/213 |
| 2011/0318555 | A1 | 12/2011 | Bookbinder | |
| 2013/0015180 | A1 | 1/2013 | Godard | |
| 2013/0133371 | A1 * | 5/2013 | Burdette | C03B 17/068 65/91 |
| 2013/0219964 | A1 * | 8/2013 | Kudva | C03B 17/068 65/29.1 |
| 2014/0318182 | A1 * | 10/2014 | Coppola | C03B 17/067 65/29.21 |
| 2014/0335331 | A1 | 11/2014 | Ellison | |
| 2014/0352356 | A1 * | 12/2014 | Anderson | C03B 17/068 65/91 |
| 2015/0030827 | A1 | 1/2015 | Gomez | |
| 2015/0037553 | A1 | 2/2015 | Mauro | |
| 2015/0051060 | A1 | 2/2015 | Ellison | |
| 2015/0051061 | A1 | 2/2015 | Kiczenski | |
| 2015/0210583 | A1 | 7/2015 | Amosov | |
| 2016/0121583 | A1 * | 5/2016 | Edwards | H01L 51/524 428/215 |
| 2016/0272528 | A1 * | 9/2016 | Darcangelo | C03B 17/065 |
| 2016/0297702 | A1 * | 10/2016 | Coppola | C03B 17/064 |
| 2016/0297703 | A1 * | 10/2016 | Aniolek | C03B 17/067 |
| 2017/0297308 | A1 * | 10/2017 | Golyatin | C03C 17/02 |
| 2017/0361574 | A1 * | 12/2017 | Kiczenski | C03B 17/02 |
| 2018/0312422 | A1 * | 11/2018 | Abramov | C03B 33/0222 |
| 2018/0370837 | A1 * | 12/2018 | Hu | C03B 17/067 |

OTHER PUBLICATIONS

"Corning Eagle XG® glass substrates Material Information", http://www.corning.com/WorkArea/showcontent.aspx?id=55075, retrieved Jan. 6, 2012.
"Elastic Properties and Young Modulus for some Materials". The Engineering ToolBox. Retrieved Jan. 6, 2012.
Werner Vogel: "Glass Chemistry"; Springer-Verlag Berlin and Heidelberg GmbH & Co. K; 2nd rev. ed. (Nov. 1994), ISBN 3-540-57572-3—book.

* cited by examiner

METHOD AND APPARATUS FOR MAKING A GLASS LAMINATE

CROSS REFERENCE TO RELATED APPLICATIONS

The present application is a divisional and claims the benefit of priority under 35 U.S.C. § 120 to U.S. Non-Provisional patent application Ser. No. 15/162,858, filed May 24, 2016 and entitled "METHOD AND APPARATUS FOR MAKING A GLASS LAMINATE," which claims the benefit of priority under 35 U.S.C. § 119 of U.S. Provisional Patent Application No. 62/168,011, the contents of both of which are relied upon and incorporated herein by reference in their entirety.

CROSS-REFERENCE TO RELATED APPLICATIONS

This application is related to, but does not claim priority to, commonly owned and assigned patent Applications:

U.S. Ser. No. 61/103,126, filed Oct. 6, 2008, entitled "ALUMINOBOROSILICATE GLASSES";

U.S. Ser. No. 61/228,290, filed Jul. 29, 2009, entitled "SODIUM RICH FUSION FORMABLE GLASS";

U.S. Ser. No. 61/263,930, filed Nov. 29, 2009, entitled "FUSION FORMABLE LOW MELTING TEMPERATURE SODIUM CONTAINING GLASS";

U.S. Ser. No. 61/604,833, filed Feb. 29, 2012, entitled "Low CTE, Ion-Exchangeable Glass Compositions and Glass Articles Comprising the Same";

U.S. Ser. No. 61/604,839, filed Feb. 29, 2012, entitled "Low CTE Alkali-Free Boroaluminosilicate Glass Compositions and Glass Articles Comprising the Same," mentions glass cladding layers that can be formed from a glass composition;

U.S. Ser. No. 61/866,272, filed Aug. 15, 2013, entitled "Alkali-Free Boroaluminosilicate Glasses with High Native Scratch Resistance";

U.S. Ser. No. 61/821,426, filed May 9, 2013, entitled "Alkali-Free Phosphoboroaluminosilicate Glass;"

U.S. Ser. No. 61/866,168, filed Jul. 15, 2013, and U.S. Ser. No. 61/878,829, filed Sep. 17, 2013, entitled "Intermediate to High CTE Glasses and Glass Articles Comprising the Same," which applications mention moderate to high CTE core sheet glasses, and laminates thereof, specifically core sheet glasses that have intermediate to high CTE values and when processed with a low CTE clad glass, the CTE mismatch creates clad compression, enhancing strength;

U.S. Ser. No. 61/933,092, filed on Jan. 29, 2014, entitled "METHOD OF MAKING A GLASS LAMINATE HAVING CONTROLLED STRENGTH"; and issued U.S. Pat. No. 8,429,936, which mentions glass having viscous, visco-elastic, and elastic zones in a fusion draw apparatus, the content of which documents are relied upon and incorporated herein by reference in their entirety.

The entire disclosure of any publication or patent document mentioned herein is incorporated by reference.

BACKGROUND

The disclosure relates to an apparatus and method of making a glass laminate, and a method for controlling the strength of a glass laminate sheet formed in a laminate fusion draw apparatus.

SUMMARY

In embodiments, the present disclosure provides, for example:

an apparatus and method of making a glass laminate, which includes applying biaxial tension to a core sheet glass of the laminate during manufacture;

a method for controlling the final strength of a glass laminate sheet formed in the disclosed laminate fusion draw apparatus; and a birefringent glass laminate article.

BRIEF DESCRIPTION OF DRAWINGS

In embodiments of the disclosure.

DETAILED DESCRIPTION

Figure 1A:
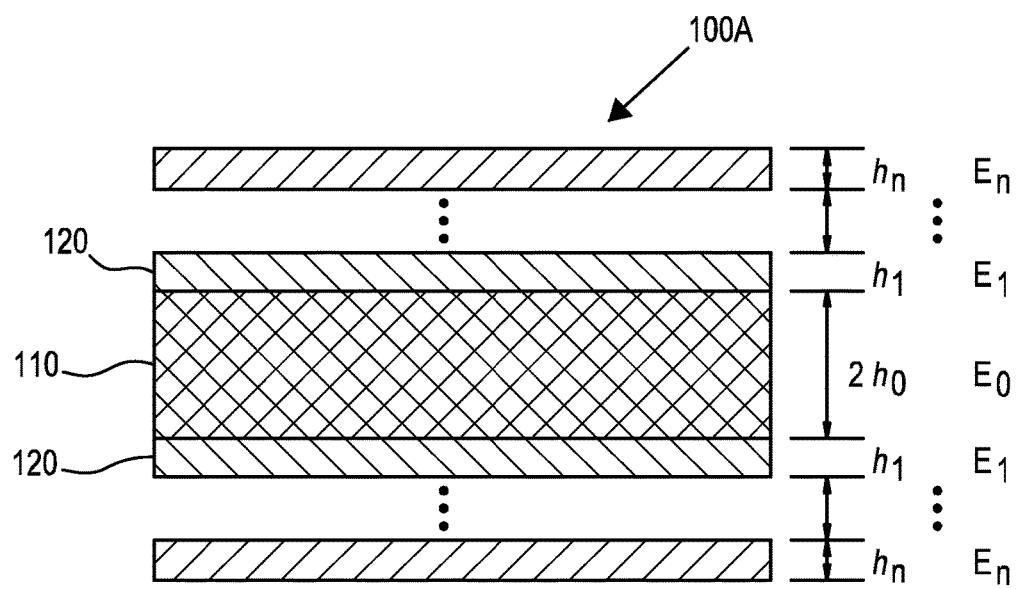
FIGS. 1A and 1B, respectively, show schematics of a multilayer laminate glass (100A)(FIG. 1A), and a three layer laminate glass (100B)(FIG. 1B).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus and method of making laminate glass products provides one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"CTE," "coefficient of thermal expansion," and like terms refer to how the size of an object changes with a change in temperature. The CTE measures the fractional change in size per degree change in temperature at a constant pressure, and the size can refer to, for example, volumetric, area, or linear.

In the present disclosure the linear CTE and area CTE are of greater interest compared to the volumetric CTE because the glass source and glass laminates are substantially isotropic. For isotropic materials, the area and volumetric thermal expansion coefficient are, respectively, approximately two and three times larger than the linear thermal expansion coefficient.

"Birefringent," "birefringence," and like terms refer to an optical property of a material having a refractive index that depends on the polarization and propagation direction of light. These optically anisotropic materials are birefringent or birefractive. The birefringence is often quantified as the maximum difference between refractive indices exhibited by the material.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Commonly owned and assigned U.S. Pat. No. 4,214,886, discloses a laminate fusion process that combines two glasses of different compositions into a two (2) or three (3)-layered laminated sheet.

It is known that the mechanical strength of a glass article can be significantly increased if an outer surface of the glass is in compression. Several methods have been used to generate surface compressive stress on a glass sheet. Thermal tempering, lamination, and ion exchange are examples. In lamination, strengthening of glass can use adjacent glass layers having differences in their coefficient of thermal expansion (CTE). Several patent documents mention this feature for laminated glass articles (e.g., U.S. Pat. Nos. 5,559,060, 7,201,965, and US 20110200804). In these laminated glass articles, the CTE of the core sheet glass has to be much larger than that of the clad glass, so that a compressive stress on the clads and a tension on core sheet glass can be generated when the laminated glass cools. In US20110200804, the clad-core sheet CTE difference is greater than $50 \times 10^{-7}$° $C.^{-1}$ to achieve 300 MPa compressive stress on clads. In many instances, it is very difficult to satisfy both the CTE requirement and the desired material properties.

Gorilla® glasses have been used as cover glass of many hand-held electronic devices. However, these cover glasses have a high CTE. Table I lists the CTE values of several Gorilla glasses. Gorilla 3 (code 2320) has the smallest CTE of $75.8 \times 10^{7}$° $C.^{-1}$ among the three listed Gorilla Glasses, and a relatively large CTE among glasses generally. The CTE of Gorilla 3 is too large to be used as a clad for a laminated glass. In contrast, Eagle XG® glass has a very small CTE at $31.7 \times 10^{7}$° $C.^{-1}$, which prevents it from being used as a core sheet, although Eagle XG® has very good optical properties.

TABLE 1

Material properties of glasses of interest.[1-3]

| Glass name | Strain point (° C.) | Annealing point (° C.) | CTE ($\times 10^{-7}$/° C.) for 0 to about 300° C. |
|---|---|---|---|
| Soda-lime glass (code 0080) | 473 | 514 | 93.5 |
| Eagle XG ® | 669 | 722 | 31.7 |
| Gorilla ® 1 glass (code 2317) | 553 | 602 | 91 |
| Gorilla ® 2 glass (code 2318) | 563 | 613 | 84.5 |
| Gorilla ® 3 glass (code 2320) | 574 | 628 | 75.8 |
| Pyrex ® (code 7740) | 510 | 560 | 32.5 |

[1]Thermal properties of Corning glasses," quartz.com/pxtherm.pdf
[2]Corning Eagle XG ® glass substrates Material Information," on the web at: corning.com/displaytechnologies/en/products/eaglexg/index.aspx
[3]Corning Gorilla ® Glass Technical Materials", on the web at corning.com/docs/specialty materials/pisheets/PI2317.pdf Thermal treatment of glass has long been practiced, usually at a temperature below the strain point or annealing point of the glass. At the annealing point ($\eta = 10^{13.2}$ Poise) stresses relax within several minutes, while at the strain point ($\eta = 10^{14.5}$ Poise) stresses relax within several hours (see Werner Vogel: "Glass Chemistry"; Springer-Verlag Berlin and Heidelberg GmbH & Co. K; 2nd rev. ed. (November 1994), ISBN 3-540-57572-3). Soda lime glass (Corning glass code 0080) has a strain point at 473° C. (see footnote 2 in Table 1 above), while Eagle XG® glass has a strain point at 669° C. (see footnote 3 in Table 1 above), and Gorilla® glass (code 2317) has a strain point of 553° C. (see footnote 4 in Table 1 above). There is about a 200° C. difference in the strain point between soda-lime glass and the Eagle XG® glass, and more than a 100° C. difference in the strain point between the Gorilla® glass (code 2317) and the Eagle XG® glass.

In embodiments, the disclosure provides an apparatus for making a glass laminate comprising:

a source of a glass core sheet;

a source of a first force, i.e., first force producing mechanism, that produces a first tension on the glass core sheet in a first axial direction;

a source of a second force, i.e., second force producing mechanism, that produces a second tension on the glass core sheet in a second axial direction; and at least one molten glass reservoir extending along a length of the apparatus and on opposite sides of the glass core sheet that delivers a source of at least two glass clads to the surface of the first and second axially tensioned glass core sheet. The apparatus operates on the work pieces, including the glass core sheet and the glass clads, to produce the strengthened glass laminate.

In embodiments, the apparatus can further comprise or include, for example, the at least one molten glass reservoir having a pass-through region, i.e., a cavity having a top opening or inlet and a bottom opening or outlet, situated between the source of at least two glass clads. In embodiments, the at least one molten glass reservoir can include, for example, an fusion draw isopipe, a slot draw, and like configurations, or combinations thereof.

In embodiments, the first axial direction and the second axial direction can be orthogonal, perpendicular, or at right angles.

In embodiments, the first force and the second force, when applied to the core glass sheet, can produce a biaxial tension on the core glass sheet.

In embodiments, the source of the glass core sheet can be selected from at least one of: a preformed sheet (e.g., FIG. 2A); a sheet generated in situ (e.g., FIG. 3); or a combination thereof.

In embodiments, the source of the glass core sheet can be, for example, static, e.g., the glass core sheet having fixed dimensions and fixed in position, semi-static, e.g., the glass core sheet having fixed dimensions and having a moving or changeable position, or dynamic, e.g., the glass core sheet having changeable dimensions and having a moving or changeable position.

In embodiments, the CTE of the core sheet ($CTE_{core}$) is greater than the CTE of the clad layer ($CTE_{clad}$), and the difference $CTE_{clad}-CTE_{core}$ is less than $10 \times 10^{-7}$° C.

In embodiments, the glass laminate can have, for example, a compressive stress strength of from 20 to 50 MPa, and the glass laminate can be, for example, at least one of: alkali-free, a high scratch resistant surface having a Knoop scratch threshold larger than 5 Newton, free of ion-exchange, or a combination thereof.

In embodiments, the disclosure provides at least three distinct methods of strengthening a glass laminate, including: 1) applying biaxial force to a pre-heated glass laminate as prescribed herein; 2) applying biaxial force to a glass laminate that has been subjected to a first and second pre-heating for specified times as prescribed herein; and 3) contacting both sides of a biaxially tensioned core glass sheet with molten clad glass as prescribed herein. Other permutations or combinations of the disclosed at least three distinct methods will be apparent to those skilled in the art.

In embodiments, the disclosure provides a method for strengthening a glass laminate, the glass laminate having a glass core sheet and at least one glass clad layer on at least one of the opposite sides of the glass core sheet, comprising:

heating the glass laminate, the glass laminate having the glass core sheet has a strain point having a difference of at least 50° C. compared to the strain point of the at least one glass clad layer;

applying biaxial force, i.e., an external tension, to the glass core sheet while the glass clad layers are in a state of stress relaxation;

cooling the glass laminate; and releasing the biaxial force on the glass core sheet.

In embodiments, the strengthened glass laminate has a compressive stress on the clad layers that is increased by from 10 MPa to 200 MPa and, for example, 20 MPa to 150 MPa, 30 MPa to 125 MPa, and 40 MPa to 100 MPa, including intermediate values and ranges, compared to an un-strengthened glass laminate.

In embodiments, heating the glass laminate can be accomplished at, for example, from 560 to 600° C.

In embodiments, the disclosure provides a method for strengthening a glass laminate, the glass laminate having a glass core sheet and a glass clad layer on at least one of the opposite sides of the glass core sheet, comprising:

a first heating of the glass laminate to 50° C. below the strain point of the glass core sheet, and the glass core sheet has a strain point of at least 50° C. higher than the strain point of the glass clad layer(s);

a second heating of the glass laminate to between the anneal point of the glass clad and the strain point of the glass core sheet, the second heating is accomplished at a temperature above the strain point of the clad layer and below the strain point of the core sheet;

bi-axially tensioning the second heated glass laminate at from 10 to 50 MPa for a sufficient time, e.g., from about 5 to 60 seconds, such as for about 10 seconds, for the stress in the clad layers to relax;

cooling, e.g., using passive methods, active methods, or a combination thereof, the laminate to ambient temperature, for example, 25° C.; and removing the bi-axial tension.

In embodiments, removing the bi-axial tension creates a compressive stress on glass clad layers.

Figure 2A:
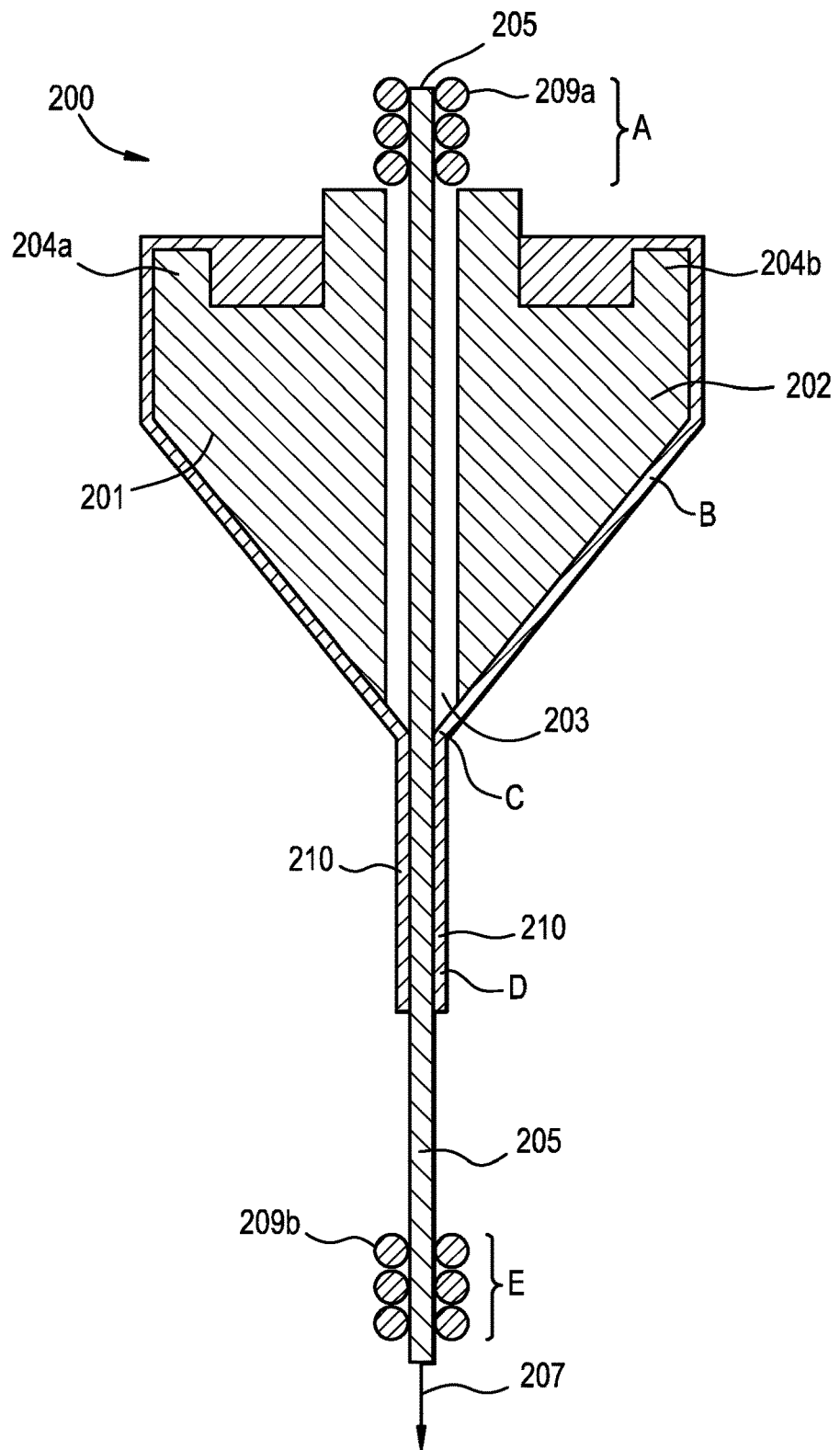
FIGS. 2A and 2B, respectively, show side and front views of bi-axial tensioning of a core sheet glass (205) in the disclosed core sheet tensioning and clad (210) drawing apparatus (200).
Figure 3:
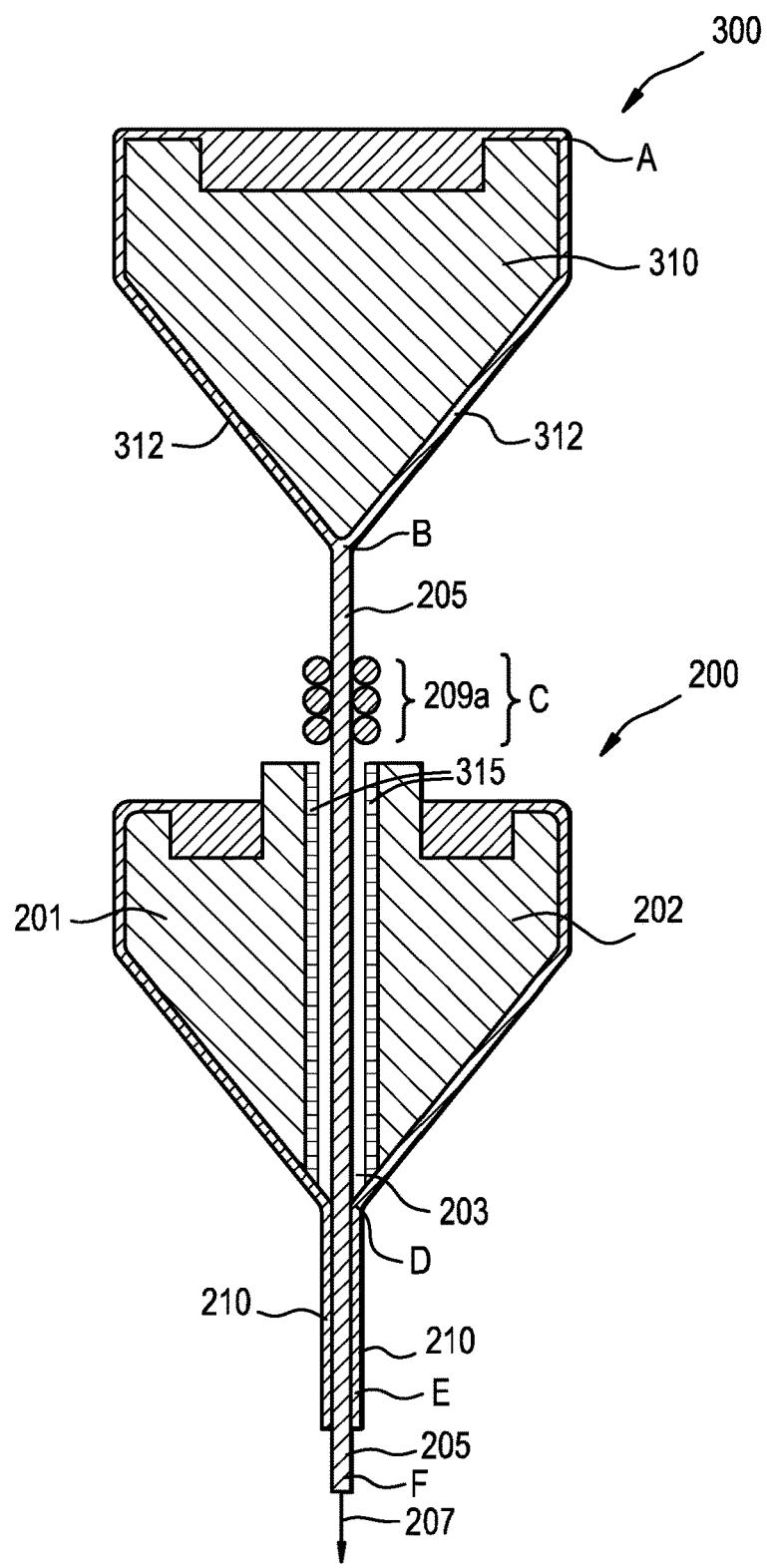
FIG. 3 shows an alternative configuration (300) of the apparatus of FIG. 2A having a double fusion draw arrangement where the core sheet (205) is drawn from an upper isopipe (310) and the clad sheet (210) is drawn from a lower isopipe (200).

In embodiments, the disclosure provides a method for strengthening a glass laminate, the glass laminate having a glass core sheet and a glass clad layer on the opposite sides of the glass core sheet, comprising:

contacting both (i.e., opposite) sides of a biaxially tensioned core glass sheet with molten clad glass, for example, flowing molten clad glass downward from a source of molten clad glass onto the opposite sides of a biaxially tensioned core glass sheet, such as illustrated in FIGS. 2A and 3. The source of molten clad glass can be, for example, a reservoir, and a first weir and a second weir extending along each side of a length of the biaxially tensioned core glass sheet, such that when molten clad glass flows over the weir on the first side and the second side of the molten clad glass reservoir, the molten clad glass drops onto or contacts the first and second sides of the heated and bi-axially tensioned solid core sheet glass.

In embodiments, the glass laminate strengthening can be accomplished, for example, free of a CTE mismatch condition.

U.S. Pat. No. 2,823,491, mentions a birefringent article including a single glass sheet having thermal tempering. Many birefringent articles are polymer based. U.S. Pat. No. 5,375,012, mentions a birefringent glass can be made by adding anisotropic additives.

In embodiments, the disclosure provides a birefringent glass laminate article, such as a birefringent waveplate, that can be prepared in accordance with the disclosed methods of making, and the birefringent glass laminate article can be achieved, for example, without thermal tempering, without polymers, or without anisotropic additives. Thus, the article's birefringent property is not attributable to (i.e., independent of): thermal tempering, a polymer, an anisotropic additive, or any combination thereof. However, the article may include such additives or processing in various applications.

In embodiments, the disclosure provides a glass laminate article comprising:

a glass core sheet; and at least one glass clad layer on at least one side of the glass core sheet, wherein the glass laminate article is birefringent.

In embodiments, the disclosure provides a method of making a birefringent glass laminate article comprising, either:

1) applying biaxial force to a pre-heated glass laminate as prescribed herein;

2) applying biaxial force to a glass laminate that has been subjected to a first and second pre-heating for specified times as prescribed herein; or 3) contacting both sides of a biaxially tensioned core glass sheet with molten clad glass as prescribed herein, wherein the applied biaxial force is symmetric or the biaxial tension is asymmetric. The extent of the birefringence of the resulting glass laminate can be characterized, for example, by the maximum difference between refractive indices exhibited by the material, or by polarimetry.

In embodiments, the disclosure provides a method of making and strengthening glass that uses a strain point difference to achieve a compressive stress on the clads of a laminated glass.

In embodiments, the disclosure provides a method for increasing the compressive stress on cladding layers of a laminated glass. With a large strain point difference between the core sheet and the clad layers, an external tension force can be applied to the core sheet glass (having a higher strain point), while the clad glass (having a lower strain point) is still in a state of stress relaxation. A compressive stress is generated when the laminated glass cools and the external tension force on the core sheet is released.

In embodiments, the disclosure provides a method for strengthening a glass laminate or glass laminate ceramic article according to the disclosed method.

In embodiments, the disclosed glass article formed by any of the disclosed apparatuses and methods can be a component in or used as, for example: a cover glass or glass backplane in consumer or commercial electronic devices including, for example, LCD and LED displays, computer monitors, and automated teller machines (ATMs); for touch screen or touch sensor applications; for portable electronic devices including, for example, mobile telephones, personal media players, and tablet computers; for photovoltaic applications; for architectural glass applications; for automotive or vehicular glass applications; for commercial or household appliance applications; or for lighting applications including, for example, solid state lighting (e.g., luminaires for LED lamps).

In embodiments, the disclosed method can use a laminate structure having, for example, an Eagle XG® glass ("EXG", strain point at 669° C.) as the core sheet glass and a Pyrex® glass (strain point at 510° C., and annealing point at 560° C.) as the clad glass layers (Table 1). The EXG and Pyrex® glasses have very similar CTEs of about $32\times10^{-7}$° $C.^{-1}$.

In an illustrative embodiment, a laminated EXG core sheet/Pyrex® clad glass sheet is uniformly heated in oven from 560 to 600° C., and a biaxial tension force is applied to both the ends and both the sides of the sheet (i.e., all sides or all ends). The stress in the Pyrex® clad glass relaxes quickly, but the stress in EXG cannot relax due to its high strain point. After a few minutes, the laminated glass sheet is permitted to cool to below 500° C. and then the external biaxial tension force is released. A compressive stress is generated in the Pyrex® glass cladding. A similar approach can be applied to other core sheet/clad pairs. In these instances, a compressive stress can be generated even if the CTE mismatch between the core sheet and the clad is small, such as less than $10\times10^{-7}$/° C.

Figure 4:
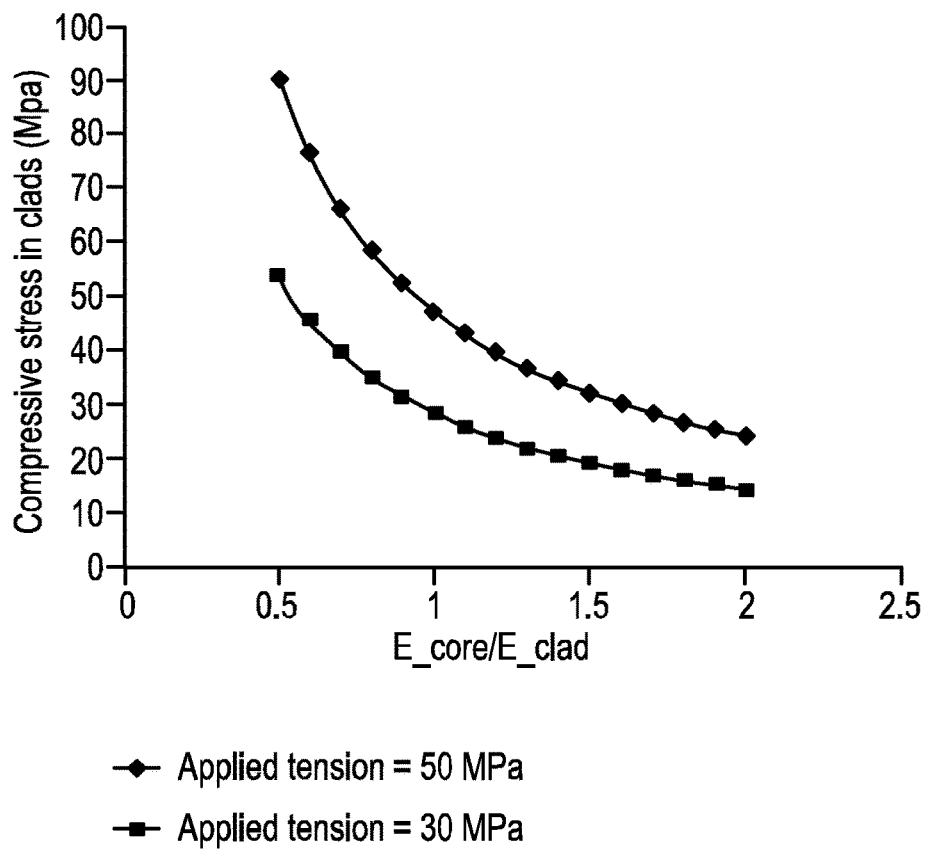
FIG. 4 shows the compressive stress achieved in clads as a function of Young's modulus of the glass core sheet ($E\_{core}$) and the clad glass ($E\_{clad}$) for selected applied tensions.

In embodiments, the disclosed apparatus and method provide several advantages including, for example:

an additional compressive stress and the accompanying additional strengthening can be generated on the clad layers in addition to the compressive stress from any CTE difference (i.e., CTE mismatch); and a large surface compressive stress, for example, 30 MPa or larger, can be generated when a small (e.g., a relatively small elastic Young's modulus is below 70 GPa, or less than 65 GPa) core sheet elastic modulus and large (a relatively large elastic Young's modulus is above 70 GPa, such as greater than 75 GPa) clad elastic modulus are used. FIG. 4 shows the benefits of having a small core sheet/clad modulus ratio. A CTE mismatch is unnecessary to achieve glass laminate strengthening.

Accordingly, the disclosed apparatus and method of making expands the composition options for the glass core sheet and glass clad selections to, for example:

large CTE (i.e., at or greater than $50\times10^{-7}$° $C.^{-1}$) glasses can be used as glass clads, such as soda-lime glass, Gorilla Glasses® 1 to 4, and like glass compositions; and small CTE (i.e., less than $50\times10^{-7}$° $C.^{-1}$) glasses can be used as the glass core sheet, such as Eagle XG®, Pyrex®, and other borosilicate glasses.

Figure 1B:
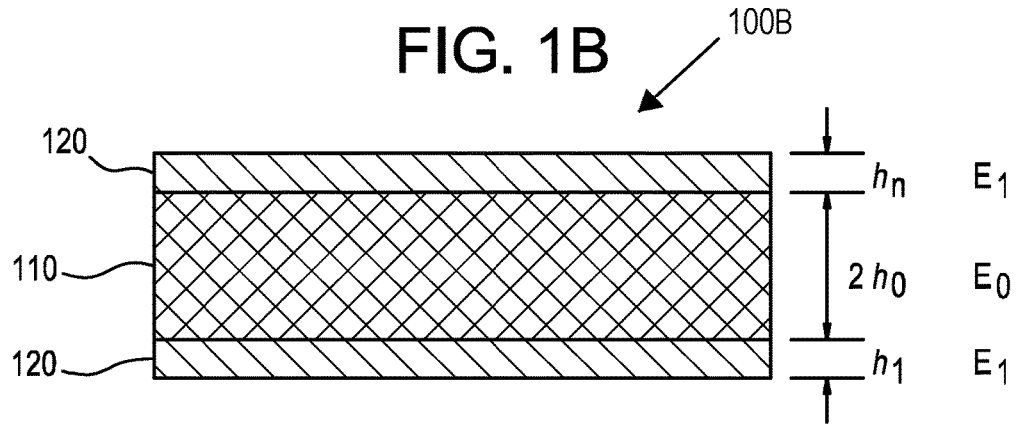

Referring to the figures, FIGS. 1A and 1B, respectively, show schematics of a multilayer laminate glass (100A)(FIG. 1A), and a three layer laminate glass (100B)(FIG. 1B), having at least one glass clad (120) on each side of the glass core sheet (110), where $E_0$ represents the Young's modulus of the core sheet, $E_1$ and $E_n$ represent the Young's modulus of the one or more clad layers, $2h_0$ represents the thickness of core sheet, and $h_1$ and $h_n$ represent the thickness of one or more clad layers.

Figure 2B:
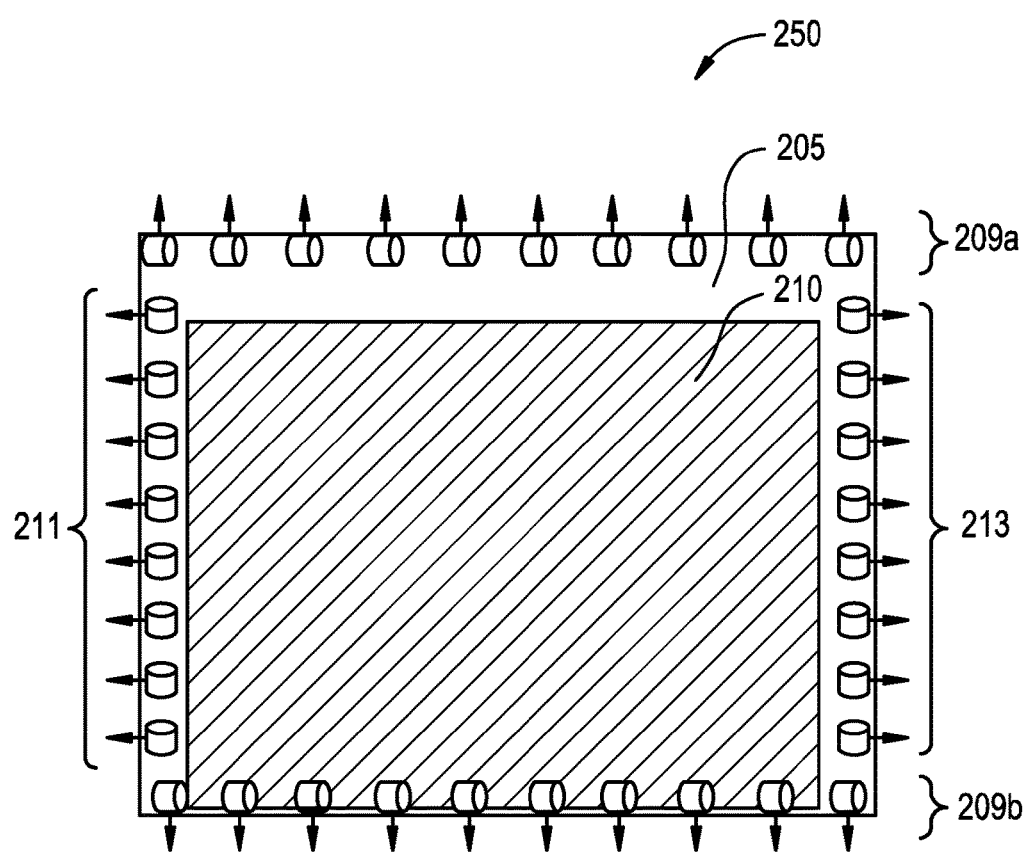

FIGS. 2A and 2B, respectively, show side and front views of bi-axial tensioning of a core sheet glass in the disclosed core sheet tensioning and clad drawing apparatus (200).

FIG. 2A provides a side view of the disclosed apparatus (200) where a solid glass core sheet (205), which core sheet is first provided or first formed by fusion or other means, and then placed in tension by, for example, pulling the core sheet axially such as by tensioning rollers (207 and 209), or a puller, a grabber, and like mechanicals, or combinations thereof. A first pulling force (207) provides a first tension and the tensioning rolls (209) maintains the first axial tension on the core sheet (205). The clad layers are generated by, for example, flowing molten glass over the weirs (204a and 204b) of the respective split isopipe sections (201, 202) to produce clad streams or layers (210) having uniform thickness. The split isopipe has an interior cavity (203) that permits positioning and tensioning of the core sheet (205) in proximity to the clad streams or layers (210).

FIG. 2B provides a front view of the glass laminate (250) in the apparatus of FIG. 2A, where the core sheet (205) having a high strain point, is tensioned by, for example, the vertical tensioning rollers (209a and 209b) and additionally tensioned by, for example, the horizontal tensioning rollers (211 and 213), for example, pulled from at least two sides to provide a second tension. To have a bi-axial compressive stress on the clads, the laminated glass structure is pulled or stretched bi-axially. For example, tension rollers (209a and 209b) tension the core sheet by pulling along one axis, such as in the vertical direction. A second tensioning of the core sheet is accomplished with tension rollers (211 and 213) along a second axis, such as orthogonally, that is, in the horizontal direction. The rollers (209a and 209b) should engage both the core and clad sheets to enable a continuous process. Additionally, the clads should be cooled, passively or actively, to below their strain point prior to reaching rollers (209b). In embodiments, the horizontal tensioning rollers (211 and 213) can be angled with respect to a horizontal line so that the glass sheet can continue moving downward while the stationary tensioning rollers (211 and 213) apply tension horizontally.

While the core glass sheet (e.g., a plate or panel) is under the bi-axial tension, the cladding layers (210) (no stress) having a low strain point, are then formed on the surface of the elastic core sheet. Both the core sheet and the clads are then permitted to, or caused to, cool down along the forming direction. A compressive stress is then created or generated on the cladding layers when the tensioning or pulling forces are released. In embodiments, the clads are cooled to below their strain point before or when they reach rollers (209b). A compressive stress is then created on the clads when they move below the rollers (209b).

In embodiments, the disclosure provides an alternative method of making a laminate glass article including: selective heating of a glass laminate that has been, for example, provided or first formed by laminate fusion or other means. The core sheet is selected to have a higher strain point, for example, of about 100° C. or more, than the strain point of either of, or a plurality of, the individual clad glass layers. Specifically, a glass laminate is heated above the temperature of the strain point of the clad strain point, for example by from 5 to 90° C., but below the temperature of the core sheet strain point. At this selective heating temperature, the glass laminate panel is pulled bi-axially for a certain time, for example, for a sufficient time for the stress in the clads to relax. Then, the core sheet and the clads are both cooled to ambient temperature, for example, 25° C., and the opposing pulling or tensioning forces (209b) were released. A compressive stress is then created on glass clad layers.

FIG. 3 shows an alternative configuration (300) of the apparatus of FIG. 2A having a double fusion draw arrangement where the core sheet (205) glass is drawn from an upper isopipe (310) and the clad (210) is drawn from the split lower isopipe (201, 202). Specifically, the overflow of molten glass on one or both sides of the upper isopipe (310) produces molten glass streams (312) that converge to form the core sheet (205). The core sheet (205) is aligned with and feed into cavity (203) between the lower isopipe (201, 202) halves. The cavity (203) can optionally include one or more, active or passive, thermal heat management members (315), such as a heater element, a cooler element, insulation, and like members, or combinations thereof. The region between the upper isopipe (310) and the split lower isopipe (201, 202) halves, or the cavity (203), or a combination thereof can be outfitted so that the core sheet glass can be properly conditioned, for example, heated, cooled, uniformly equilibrated, and like conditioning, prior to being contacted with either or both of the molten clad glass streams (210).

FIG. 4 shows the compressive stress achieved in clads as a function of Young's modulus of the glass core sheet ($E\_{core}$) and the clad glass ($E\_{clad}$), when the applied biaxial tension was 50 MPa and 30 MPa, respectively. The thickness ratio ($h_1/h_0$) was 1:9 for clad to half core sheet. It is assumed that Poisson's ratios are 0.21 for both the clad and the core sheet. FIG. 4 also shows plots of the elastic modulus for various combinations of the glass clads and the glass core sheet.

Figure 5:
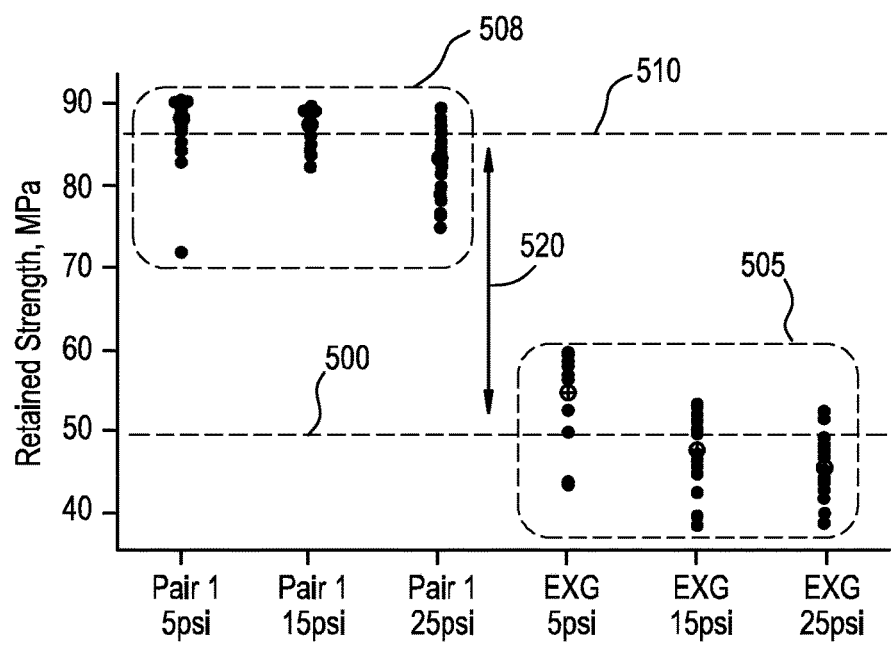
FIG. 5 shows examples of the improved compressive stress (CS) for selected glass laminates (508) compared to un-laminated glass sheets.

FIG. 5 shows examples of the improved compressive stress (CS) for selected glass laminates. These are abraded ring-on-ring experimental results of strengthened laminate glass and non-strengthened laminate glass, and EXG glass after different abrasion pressures. Here the strengthened glass is a laminate strengthened due to the CTE mismatch between the glass core sheet and the glass clad. The compressive stress in the clad layer is about 35 MPa. The abrasion is accomplished using 5 milliliter 90 grit SiC particles under pressures of 5, 15, and 25 psi (i.e., 34.5, 103.4, and 172.4 kPa). One can readily see the benefits of compressive stress strengthening against the abrasion flaws. The compressive stress profile generated according to the disclosed method will be close to the CTE mismatch induced stress profile for a given clad—core pair. Thus, one can expect a similar strength increase for the strengthened glass articles of the disclosed method. More specifically, FIG. 5 shows that the comparative laminated glasses, having a CTE mismatch induced stress, have a compressive stress of 35 MPa. The comparative laminated glasses contained in region (508) have superior retained strength performance compared to, for example, an un-strengthened Eagle XG® glass contained in region (505). Retained strength is the material strength of a glass sample after a flaw has been introduced such as by damage resulting from dropping the glass sample or dropping a device that includes the glass sample. Retained strength can be measured by dropping a device, such as a cell phone having a cover glass made from the strengthened sample glass, and comparing the strength of the strengthened glass sample with an un-strengthened glass sample in the same drop test. Glass having a higher retained strength is more likely to survive a drop test compared to glass having a lower or no retained strength. The compressive stress generated according to the disclosed method can be, for example, as high as 50 MPa. The laminated glass having a 50 MPa compressive stress according to this disclosed method would have similar enhanced retained strength performance. Additionally, FIG. 5 shows the average retained strength for un-strengthened laminates as dotted line (500); glass pair 1 laminates without the disclosed laminate strengthening are contained in region (505)(such as Eagle XG®); and the glass pair 1 laminates not having the disclosed laminate strengthening are contained in region (508), and which glass pair 1 pairs were prepared by available double fusion draw laminate glass methods and apparatus. The compressive stress of the double fusion draw laminate samples is created by a CTE mismatch between the core and the clads. These results demonstrate the benefits of the compressive stress on clads and is described further in Comparative Example 4. The average retained strength for strengthened laminates is given by dotted line (510); and the average retained strength benefit or improvement of the strengthened laminates versus the un-strengthened laminates is given by the differential vertical line (520) (i.e., a net compressive stress strengthening of about 35 MPa).

Figure 6:
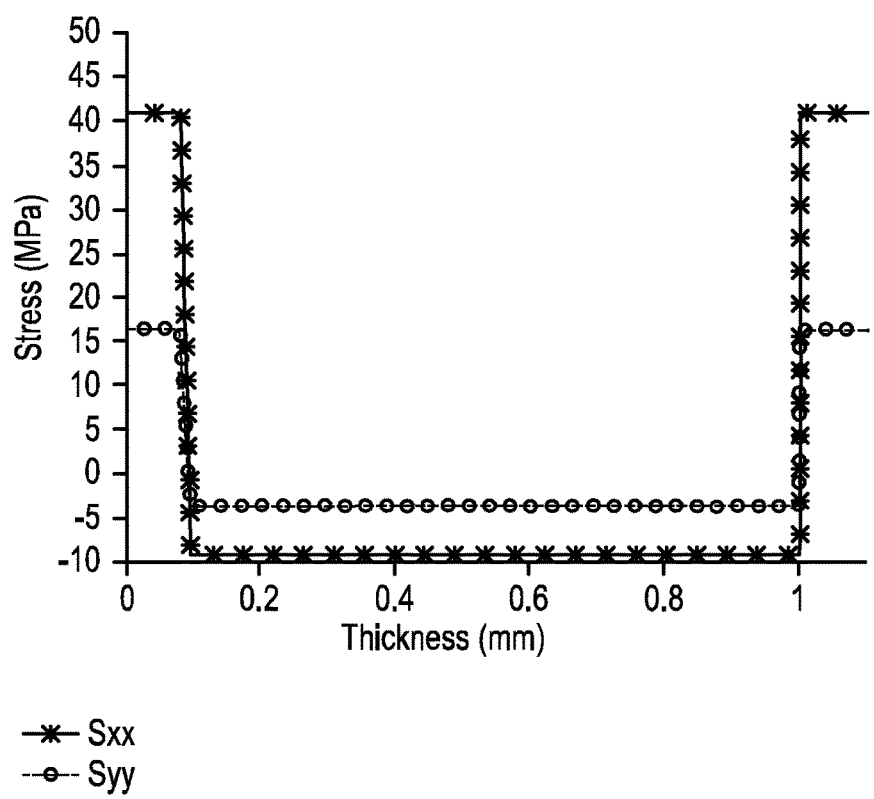
FIG. 6 shows an example of how an x/y asymmetric stress condition can be achieved in the laminate product by applying different pull forces in the respective horizontal (x) and vertical (y) directions.

FIG. 6 shows a plot of the asymmetric stress condition having a horizontal tension of 50 MPa and a vertical tension of 20 MPa. The resultant clad compression and core tension differ considerably in the horizontal direction compared to the vertical direction. The disclosed asymmetric stress condition and result can have applications, for example, in the optical arts, where the asymmetric stress can be used to impart a birefringence property to the resulting glass laminate, where the refractive index is different in each of the x and y directions.

Figure 7:
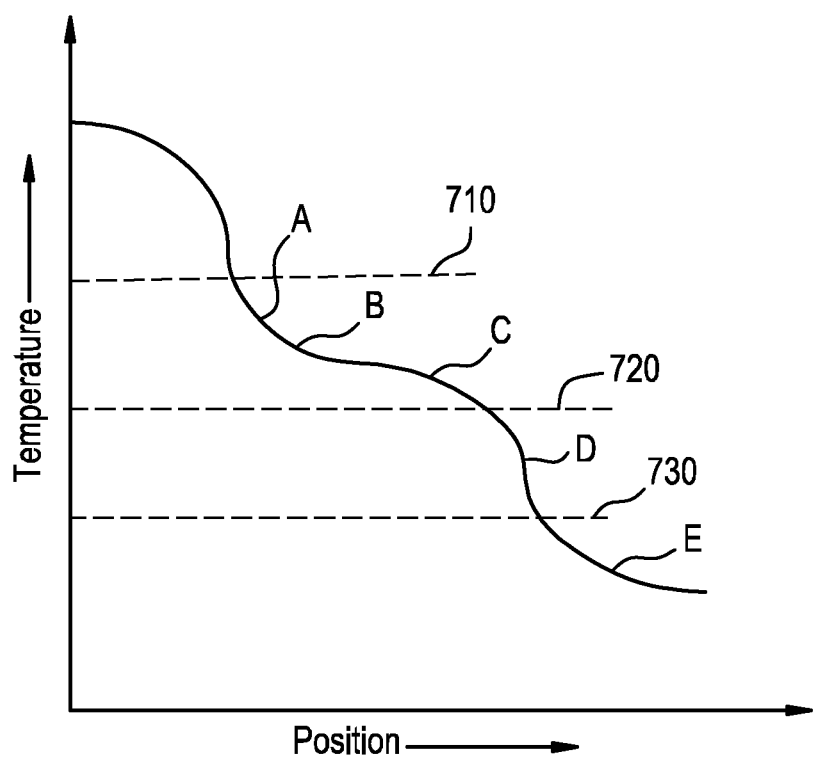
FIG. 7 shows the temperature profile for a stress condition leading to birefringent glass laminate of FIG. 6 using pull tension in a preformed core and clad fusion draw combination.

FIG. 7 shows the temperature profile for a stress condition leading to birefringent glass laminate of FIG. 6 using pull tension in a preformed core and clad fusion draw combination. The temperature lines for the strain point of core (710), the annealing point of clad (720), and the strain point of clad (730) are shown. The letters A through E correspond approximately to the lettered locations in FIG. 2A.

Figure 8:
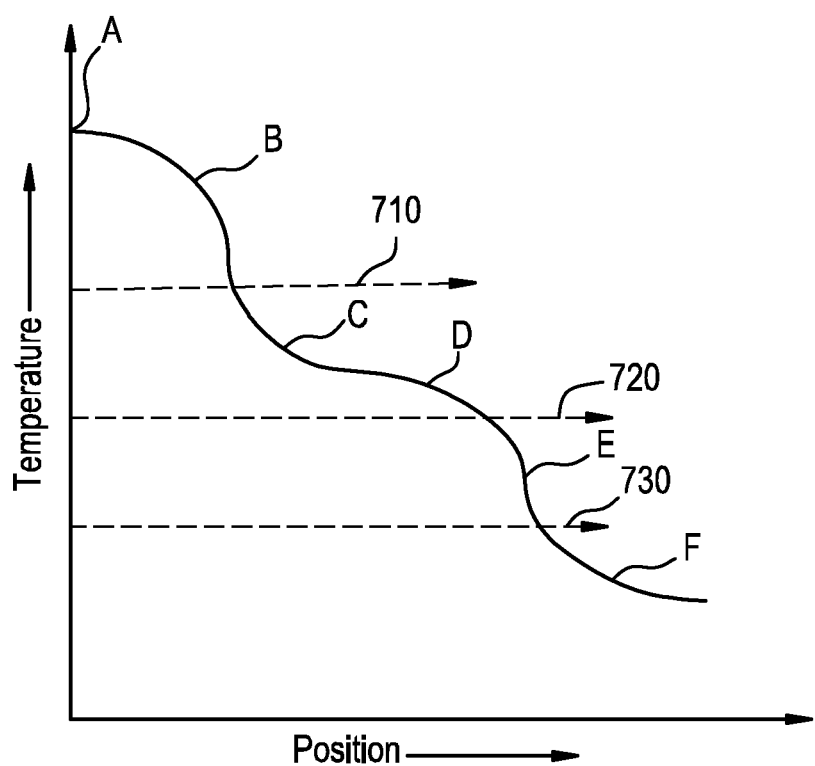
FIG. 8 shows the temperature profile for a glass laminate using pull tension in a laminated fusion draw.

FIG. 8 shows the temperature profile for a glass laminate using pull tension in a laminated fusion draw. The temperature lines for the strain point of core (710), the annealing point of clad (720), and the strain point of clad (730) are shown. The letters A through F correspond approximately to the lettered locations in the apparatus of FIG. 3.

Figure 9:
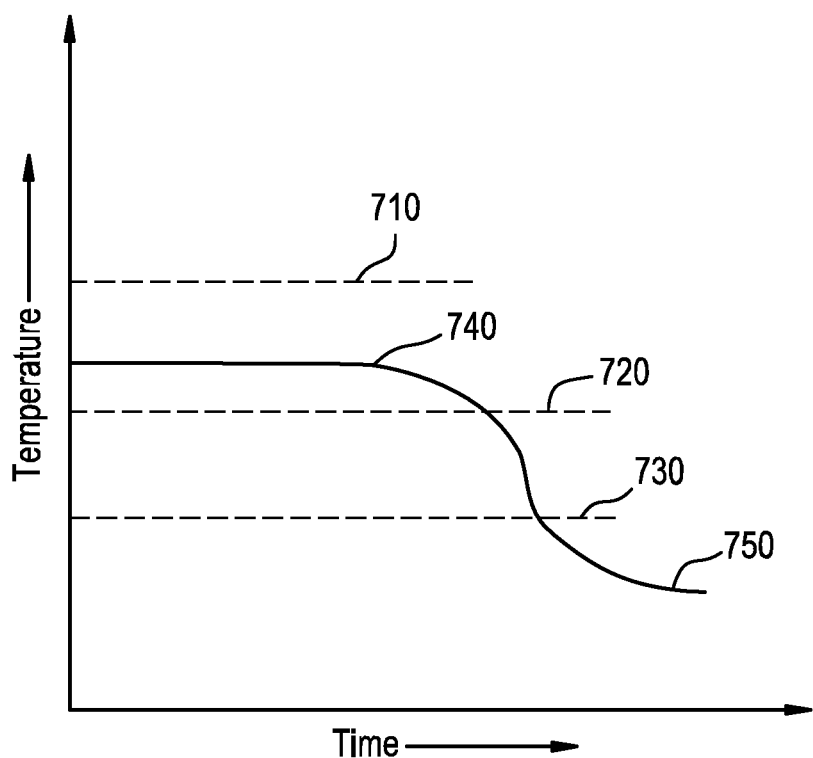
FIG. 9 shows the temperature profile for a glass laminate, that applies a pull tension off-line.

FIG. 9 shows the temperature profile for a glass laminate, which applies a pull tension off-line. The time to pull the core (740), and the time to release the tension (750) are shown.

General Procedures for Laminate Glass Sheet Strengthening

Stress Calculation Based Upon the Elastic Deformation of Core Sheet and Clad Glasses As illustrated in FIG. 1, assume that an initial bi-axial stress state, denoted as $\sigma_0^*$, is applied to the glass core sheet before the glass clad is put on the core sheet. After the glass clad is put on the core sheet, the initial stress state is released. The whole laminate should satisfy the equilibrium equation (1):

$$2\sigma_0 h_0 + 2\sigma_1 h_1 = 0 \quad (1)$$

where $\sigma_0$ and $\sigma_1$ are the equilibrium stresses in the glass core sheet of thickness $2h_0$ and glass clad layers each of thickness $h_1$, respectively, after the initial tensile stress in the glass core sheet is released. Here, as in general convention, the tensile stress is taken as positive and the compressive stress is taken as negative. Further, the system should also satisfy the compability equation (2) between core sheet and clad layer as:

$$\frac{1-v_0}{E_0}(\sigma_0^* - \sigma_0) = -\frac{1-v_1}{E_1}\sigma_1 \quad (2)$$

where $v_0$, $v_1$, $E_0$, $E_1$ are the Poisson's ratio and Young's modulus of core sheet and clad glasses, respectively. After rearrangement, the compressive stress in the clad layer due to pre-stressed core sheet glass can be estimated by equation (3):

$$\sigma_1 = -\frac{\sigma_0^*}{\left(\frac{h_1}{h_0}\right) + \left(\frac{1-v_1}{E_1}\right)/\left(\frac{1-v_0}{E_0}\right)} \quad (3)$$

With this equation, one can estimate the magnitude of compressive stress being generated by the pre-applied tensile stress in the glass core sheet as a function of the thickness ratio and glass material properties.

FIG. 4 plots the obtained compressive stress on clads as a function of Young's modulus of core sheet and clad glasses, when the applied tension is 50 MPa or 30 MPa. In plotting FIG. 4, the thickness ratio $h_1/h_0$ is 1:9 for clad to half core sheet, and it was assumed that the Poisson's ratios are 0.21 for both clad and core sheet. It is practical to use a thin clad and relatively thick core sheet. FIG. 4 shows a high compressive stress, of about 100 MPa, can be generated when the core sheet's Young's modulus is much smaller than clad's Young's modulus. A ratio of 0.5 for the core sheet and clad's Young's modulus is achievable. A small Young's modulus of about 50 GPa was reported for some alkali-free glasses (see commonly owned and assigned US 20150051060, entitled "Alkali-doped and alkali-free boroaluminosilicate glass," which mentions Alkali-Free Glass with High Native Scratch Resistance), and large Young's modulus of glass can reach 90 GPa (see "Elastic Properties and Young Modulus for some Materials," in The Engineering ToolBox, on the web at engineeringtoolbox.com/young-modulus-d_417.html, accessed 2012 Jan. 6).

For common glasses, the Young's modulus and Poisson's ratio do not vary much, so that equation 3 can be reduced to equation (4):

$$\sigma_1 = -\frac{\sigma_0^*}{\left(\frac{h_1}{h_0}\right) + 1} \quad (4)$$

The compressive stress on clads can be easily estimated as $\sigma_1 = \sigma_0$ when the clad thickness $h_1$ is much smaller than the core sheet thickness, $h_0$. It is clearly shown in FIG. 4 that the compressive stress is about 50 MPa and 30 MPa for the two instances when the Young's modulus ratio of $E_{core}/E_{clad}=1$.

EXAMPLES

The following Examples demonstrate how to strengthen laminate glass products using the disclosed general procedures.

Example 1 (Prophetic)

Glass Pairs

In embodiments, the glass core sheet and glass clad preferably have a large strain point difference, for example, at least 50° C. or more, such as 100° C., 150° C., 200° C., and like values, including intermediate values and ranges, so that the stress applied from the external force is applied to the laminated glass, and can quickly relax in the glass clad layers, while stress in the glass core sheet cannot relax. Instead, the applied tension remains on or within the glass core sheet. Thus, a compressive stress is generated in the clad when the laminated glass cools to below the strain point of the clad layers and the external force on the core sheet glass is released.

In embodiments, one can select Eagle XG® glass (EXG, strain point at 669° C.) as the glass core sheet and Pyrex® glass (strain point at 510° C., and annealing point at 560° C.) as the glass clad (see Table 1). EXG and Pyrex® glass have very similar CTE values of about $32 \times 10^{-7}$ °C.$^{-1}$. In a modified fusion draw apparatus as shown in FIGS. 2A and 2B operated at from 560 to 600° C., a biaxial tension is applied to the EXG glass core sheet during laminate application of the clad glass onto the core sheet. For an apparatus to apply tension onto the glass core sheet, one can use rollers on the bottom of the draw to apply tension onto the laminated glass. The upper rollers can maintain core sheet tension as shown in FIG. 2A. Also on two sides, rollers can be used to apply horizontal forces onto the glass core sheet as shown in FIG. 2B. The stress in the Pyrex® glass clad layers relaxes quickly, but the stress in the EXG glass core sheet cannot relax due to its high strain point. After a few minutes, the laminated glass still within the surrounding draw housing (not shown) cools to below 500° C., and then the biaxial tension external force is released. The laminated glass is preferably still be in the draw housing just before cutting. A compressive stress is therefore generated in the Pyrex® glass cladding. In embodiments, the process can be accomplished in a fusion draw mode, in a static mode, or both.

In embodiments, one can select a laminate pair comprised of, for example, Gorilla® glass for the core sheet and a soda-lime glass for the clads. The CTE values of the Gorilla® glass and the soda-lime glasses are very similar and near $90 \times 10^{-7}/°$ C. (see Table 1). The Gorilla® glass has a strain point of about 560° C. and the soda-lime has a strain point of about 473° C. This glass pair can be processed in a modified fusion draw apparatus as shown in FIG. 2 operated at, for example, about 520° C. This pair can also be used in fusion draw mode, static mode, or both. The soda-lime glass clads can relax stress quickly at 520° C. since its annealing temperature is 514° C. (see Table 1), whereas the Gorilla® glass core sheet will not relax stress for several days.

A similar approach can be applied to other core sheet and clad pairs, so long as the core sheet has higher strain point than the clad. If the CTE of the glass core sheet is larger than the glass clad (i.e., $CTE_{core} > CTE_{clad}$), it can be very beneficial since stress induced by the CTE mismatch and the external stress provided by the disclosed method can achieve very high compressive stress, for example, greater than 100 MPa, in the glass clads. However, if the CTE of the glass core sheet is less than the CTE of the glass clad (i.e., $CTE_{core} < CTE_{clad}$), then the stress induced by CTE mismatch can work against the external stress. In preferred embodiments, the disclosed method calls for the CTE of the core sheet to be not much smaller (roughly $10 \times 10^{-7}/°$ C.) than the CTE of the clads. The disclosed method can have a particular value when, for example: $CTE_{core} > CTE_{clad}$, or $CTE_{clad} - CTE_{core} < 10 \times 10^{-7}/°$ C.

Example 2 (Prophetic)

Laminated Glass Preparation

The glass core sheet is first formed by fusion or other means. The glass core sheet is pulled or axially tensioned as shown in FIG. 2A, and also pulled from two opposite sides as shown in FIG. 2B, which place the core sheet (i.e., plate or panel) under bi-axial tension. One can use rollers on the bottom of draw to apply tension onto the laminated glass. The upper rollers can maintain core sheet tension as shown in FIG. 2A. Also on two sides, the rollers that pull the sheet horizontally can be similar to or the same as the vertical rollers, and apply horizontal forces onto the glass core sheet. Next, the cladding layers (no stress) are formed on top of elastic core sheet by, for example, fusion draw. Both the core sheet and the clads cool along the forming direction. A compressive stress is then created on the cladding layers when the pulling forces on the core sheet glass are released. In this instance, the compressive stress is created when the laminated glass moves below the lower vertical pulling rollers (207). There is no external force below rollers (207).

Example 3 (Prophetic)

Laminated Glass Preparation

Another embodiment of this disclosure is shown in FIG. 3. The laminated glass is first formed by laminate fusion or other means (see for example, US patent pub. 20110200804). The glass core sheet selected has a higher strain point, for example 100° C. or more, than the selected glass clads. Then the laminated glass is heated to above the clad strain point, but lower than the core sheet strain point. At this temperature, the glass panel is bi-axially pulled or tensioned for a sufficient time, i.e., sufficiently long enough that the stress in clad layers can relax. Then, the core sheet and the clads are cooled to room temperature and the pulling force is released. A compressive stress is then created on cladding layers.

Comparative Example 4

Benefits of Compressive Stress on Glass—CTE Mismatch

FIG. 5 shows abraded ring-on-ring experimental results of a non-inventive strengthened laminate glass compared to an un-strengthened non-laminate glass. The strengthened laminate glass is: Pair 1: clad: 714AWF (modified EXG-like); and the core sheet: 2916 (a photovoltaic glass (PV)). The non-strengthened non-laminate glass is a non-laminated EXG glass having a thickness of 0.7 mm and the pair 1 laminate has a thickness of 0.8 mm. A compressive stress of about 35 MPa refers here to the compressive stress on the clad layer that arises from the CTE mismatch between the core sheet and the clad glasses, and not from the disclosed method. This comparative example illustrates the potential benefits of additional compressive stresses on the clad surface.

EXG glass was selected and measured after different abrasion pressures. The glass was laminate strengthened using CTE mismatch of the glass core sheet and the glass clads. The compressive stress in the clad layer was about 35 MPa. Abrasion is a standardized procedure used to introduce controlled flaws on glass surface and then to test how much retained strength the glass has after the abrasion, which is generally one method to characterize 'damage resistance'. The abrasion process used 5 milliliter 90 grit SiC particles and the SiC particles were impacted on a quarter inch diameter region in the center of a 50 mm by 50 mm glass coupon. The abrasion pressure can vary. Generally 5 psi abrasion can introduce, for example, 20 to 30 micrometer deep flaws in the glass. Higher abrasion pressures tend to introduce deeper and deeper flaws. The abrasion used 5 milliliter 90 grit SiC particles under 5, 15, and 25 psi pressures. Clearly, the benefits of compressive stress against the flaw can be seen. The compressive stress profile generated by the disclosed method will be close to the CTE mismatch induced stress profile. Therefore, one would expect a similar strength increase of a strengthened glass article prepared according to the disclosed method. Given the Comparative Example 4 where the compressive stress is generated from CTE mismatch, an unmistakable strength benefit is realized. Since the disclosed method can also provide a similar magnitude of compressive stress, physically, the disclosed article should also provide similar strength benefits.

Pair 1 is a 1.5 mm thick laminate having a surface compression of 35 MPa and the compressive layer thickness is about 187.5 microns. The abrasion pressure is 5 psi, 15 psi, and 25 psi with 1 mL 90 grit SiC particles for 5 seconds. EXG is 0.7 mm thick and the abrasion pressure is 5 psi, 15 psi, and 25 psi, with 1 mL 90 grit SiC particles for 5 seconds.

In embodiments, the rollers do not leave significant marks on the core. The temperature of the core is below its strain point when the core makes contact with the rollers. The stress on the core quickly becomes homogeneous. The stress profile of laminated glass articles made by the disclosed methods are similar to the stress profile of laminated glass articles made by, for example, conventional double fusion draw methods. However, if the tensile stress is not isotropic (i.e., anisotropic where the vertical tension is different from the horizontal tension), then the stress profile can be different.

Example 5 (Prophetic)

Method of Making a Birefringent Glass Laminate Article

Example 1 is repeated with the exception that the following criteria are selected to achieve a birefringent glass laminate article: an asymmetric pulling tension: sxx=50 MPa, syy=20 MPa; Young's modulus: $E_{clad}=E_{core}$; thicknesses: core of 0.9 mm; clads 0.1 mm; core tension: sxx=9.1 MPa, syy=3.6 MPa; and expected (by modeling) resultant compression: sxx=41 MPa, syy=16 MPa.

The disclosure has been described with reference to various specific embodiments and techniques. However, it should be understood that many variations and modifications are possible while remaining within the scope of the disclosure.

What is claimed is:

1. A method for strengthening a glass laminate, the glass laminate having a glass core sheet and at least one glass clad layer on at least one of the opposite sides of the glass core sheet, comprising:
   heating the glass laminate, the glass laminate having the glass core sheet has a strain point having a difference of at least 50° C. compared to the strain point of the at least one glass clad layer;
   applying biaxial force to the glass core sheet while the glass clad layers are in a state of stress relaxation;
   cooling the glass laminate; and
   releasing the biaxial force on the glass core sheet.

2. The method of claim 1, wherein the strengthened glass laminate has a compressive stress on the clad layers that is increased by from 10 MPa to 200 MPa compared to an unstrengthened glass laminate.

3. The method of claim 1, wherein heating the glass laminate is accomplished at from 560 to 600° C.

4. A method for strengthening a glass laminate, the glass laminate having a glass core sheet and a glass clad layer on at least one of the opposite sides of the glass core sheet, comprising:
   a first heating of the glass laminate to 50° C. below the strain point of the glass core sheet, and the glass core sheet has a strain point of at least 50° C. higher than the strain point of the glass clad layer;
   a second heating of the glass laminate to between the anneal point of the glass clad and the strain point of the glass core sheet, the second heating is accomplished at a temperature above the strain point of the clad layer and below the strain point of the core sheet;
   bi-axially tensioning the second heated glass laminate at from 10 to 50 MPa for a sufficient time for the stress in the clad layers to relax;
   cooling the laminate to ambient temperature; and
   removing the bi-axial tensioning.

5. The method of claim 4, wherein removing the bi-axial tensioning creates a compressive stress on glass clad layers.

* * * * *